2,902,407
WAX-COATED PENICILLIN PRODUCT

Herbert M. Gross and Robert A. Shurter, Jr., Terre Haute, Ind., assignors to Commercial Solvents Corporation, Terre Haute, Ind., a corporation of Maryland No Drawing. Application June 14, 1955
Serial No. 515,540

3 Claims. (Cl. 167—82)

Our invention relates to wax-coated penicillin, and more particularly, it relates to a stable, palatable wax-coated potassium penicillin product.

It is well known in the medical profession that a palatable potassium penicillin product is needed for administration over prolonged periods to patients, particularly children, afflicted with such diseases as rheumatic fever, arthritis, bacterial endocarditis, etc. Such diseases generally require the administration of up to one million units of penicillin per day for a period ranging from about 5 to about 10 years. Since absorption of this drug is essential, the use of potassium penicillin is preferred despite the taste of this material. Potassium penicillin is a bitter, unpleasant tasting material, the bad taste of which cannot be adequately masked by ordinary means, that is, merely mixing flavoring agents with potassium penicillin is not sufficient to overcome the unpleasant taste of this material.

We have now discovered a palatable potassium penicillin product wherein the unpleasant taste of potassium penicillin is completely masked and the product actually has a pleasant taste. Furthermore, our new product is stable, economical, and relatively simple to prepare.

Our new product consists essentially of buffered crystalline potassium penicillin particles coated with and/or embedded in wax, the coated penicillin particles of a critical size being mixed with a suitable flavoring agent or agents. Any of the usual buffering materials ordinarily employed with crystalline potassium penicillin can be employed in our new product. Such buffering agents include sodium citrate, calcium carbonate, aluminum hydroxide, sodium benzoate, magnesium oxide, dihydroxy aluminum aminoacetate, sodium salts of fatty acids, etc. The flavoring agent can be any of the agents customarily employed in the pharmaceutical industry, such as, for example, cyclamate sodium, malted chocolate flavor, sucrose, cocoa, vanilla, saccharin, mint, oil of wintergreen, etc.

In carrying out our invention, we can employ any of the usually available waxes including natural waxes such as beeswax, carnauba wax, candelilla wax, sugar cane wax, spermaceti wax, etc.; petroleum waxes including paraffin waxes, and microcrystalline waxes; synthetic waxes such as higher polyethylene glycols, esters of polyhydric alcohols, etc. and including wax blends of various kinds. We prefer to employ the so-called microcrystalline waxes because they are readily available, they are impervious to water and other agents which have a deteriorating effect upon crystalline potassium penicillin, and they are inert to the crystalline potassium penicillin which is the essential active ingredient of our new product. Furthermore, microcrystalline waxes are physiologically inactive as opposed, for example, to paraffin waxes which have a laxative effect in the body. Microcrystalline waxes are more fully described in Commercial Waxes, H. Bennett (1944), Chemical Publishing Company, Inc., Brooklyn, New York, beginning at page 60.

In preparing our new stable, palatable penicillin product, we heat the microcrystalline wax to a temperature of about 95° C. in order to melt the same and to the melted wax, we then add buffered, crystalline potassium penicillin and agitate the mixture. After thorough agitation and mixing of the penicillin and wax, we then transfer the mixture to suitable cooling equipment to cool and solidify the same. Following solidification of the wax-coated buffered, crystalline potassium penicillin, we then grind the product to any desired particle size of 80 mesh or larger since we have found that when the product is ground to particles smaller than this critical size the bitter objectionable taste of the penicillin cannot be masked satisfactorily. We then mix the ground product consisting of fully coated and partially coated or wax-imbedded penicillin crystals with the flavoring agent or agents selected.

In preparing our new product, we preferably produce it so that it contains about 110,000 units of penicillin per gram and in so doing we can then make a label claim to a potency of 100,000 units per gram. Such a concentration of penicillin would permit one to take 300,000 units of penicillin by taking one rounded teaspoonful of our new product. Our new product can, of course, be administered directly as such or it can be mixed in milk or other beverage, cereal, ice cream, custard, etc. depending upon the desires of the patient. Mixing of our new product with food is a particularly satisfactory method of administering the product to children.

The following example is offered to illustrate our invention; however, we do not intend to be limited to the specific materials, procedures, or proportions shown. Rather we intend to include within the scope of this invention all equivalents obvious to those skilled in the art.

EXAMPLE I

A 6.35 pound portion of microcrystalline wax was heated to a temperature of 95° C. to melt the same. To the melted wax, 910 grams of buffered crystalline potassium penicillin was added and the mixture then agitated until the two components were thoroughly mixed. The mixture was then transferred to a pan wherein it was cooled and solidified. Following solidification of the mixture, the material was ground through a number 12 screen and the ground mixture of wax-coated and wax-embedded penicillin then screened through a number 30, a number 40, and a number 60 screen. Equal amounts of material retained on the number 40 and number 60 screens were mixed and to the resulting mixture was added 4.75 pounds of malted chocolate concentrate and 1.2 pounds of cyclamate sodium. The added flavoring agents were thoroughly mixed with the wax-coated penicillin and the material then dispensed into two-ounce jars, 36 grams being dispensed per jar.

A batch of our new palatable wax-coated potassium penicillin product produced as described above in Example I except containing 123,500 units of potassium penicillin per gram was subjected to thermal stability tests wherein the material was stored for six months at temperatures of 25, 40, and 60° C. The product stored at each of the three temperatures was sampled and assayed at the end of one month's storage and at the end of six months' storage and the results are shown in the following table.

Table I
THERMAL STABILITY TEST

| Storage Period | 25° C., Units/Gm. | Percent | 40° C., Units/Gm. | Percent | 60° C., Units/Gm. | Percent |
|---|---|---|---|---|---|---|
| 0 Day | 123,500 | 100 | 123,500 | 100 | 123,500 | 100 |
| 1 Month | 126,700 | 100 | 123,600 | 100 | 124,200 | 100 |
| 6 Months | 130,500 | 100 | 123,500 | 100 | 123,000 | 100 |

A series of ten patients was administered our new product by giving each of the patients a single oral dose of our new product in the amount of 600 thousand units of potassium penicillin. Following administration of our new product, penicillin blood levels in each of the patients were determined at intervals of 1 hour, 2 hours, 4 hours, 6 hours, and 9 hours following administration. The following table shows the results obtained, the results given being an average for the 10 patients administered our new product.

Table II
BLOOD LEVELS

| Hours | 0 | 1 | 2 | 4 | 6 | 9 |
|---|---|---|---|---|---|---|
| Units Ml. serum | 0 | 0.859 | 0.331 | 0.124 | 0.061 | 0.010 |

As indicated above, one of the most advantageous features of our new product is its pleasant taste, making the product acceptable from this standpoint to patients be they adult or child. As indicated, buffered crystalline potassium penncillin has a very bitter taste which cannot be masked by conventional methods. On the other hand, our new product consisting of wax-coated buffered crystalline potassium penicillin particles of a certain minimum size, and a flavoring agent or agents is pleasant tasting and essentially no bitterness stemming from the presence of crystalline potassium potassium penicillin can be noted.

The following table shows the results of a taste test

Table III

| Sample Number | Wax only or Wax Penicillin [1] | Mesh Size | Tasters [2] | | | | | | | | | |
|---|---|---|---|---|---|---|---|---|---|---|---|---|
| | | | 1 | 2 | 3 | 4 | 5 | 6 | 7 | 8 | 9 | 10 |
| 7 | WP | 20 | N | N | N | N | N | N | N | N | N | N |
| 13 | WP | 30 | N | N | N | N | N | B | N | N | N | N |
| 4 | WO | 40 | N | N | N | N | N | N | N | N | N | N |
| 1 | WP | 40 | N | B | N | N | B | B | N | N | N | N |
| 17 | WO | 80 | N | N | N | N | N | N | N | N | N | N |
| 14 | WP | 80 | BO | B | B | B | B | B | B | B | B | B |
| 11 | WO | 100 | N | N | N | B | N | N | N | N | N | N |
| 2 | WP | 100 | BO | BO | BO | B | B | BO | B | B | BO | B |

[1] WO: Wax only, WP: Wax coated penicillin.
[2] N: No bitter taste, B: Bitter taste, BO: Objectionably bitter taste.

wherein 10 different subjects were given a number of samples of our new product containing the potassium penicillin and some samples containing no penicillin but otherwise being the same as the penicillin-containing product. The samples were of varying mesh size and the subjects were asked to classify the taste as objectionably bitter, merely bitter, or no bitter taste. The samples contained 55% by weight wax-coated penicillin or just wax, 43% by weight chocolate flavored malted milk concentrate, 0.5% by weight sodium citrate and 1.5% by weight cyclamate sodium.

It can be seen from the above table that when the particle size of the wax coated penicillin decreased below 80 mesh, there was a large number of subjects who considered the taste objectionably bitter while for particle sizes of 80 mesh and larger, essentially all the subjects considered the product merely bitter or as having no bitter taste at all.

Now having described our invention, what we claim is:

1. An oral therapeutic penicillin preparation in solid particulate form which comprises a buffered crystalline potassium penicillin coated with and embedded in solid particles of a wax which is solid at room temperatures, inert to the penicillin, impervious to water and substantially inactive physiologically, said preparation having a potency of about 100,000 to 110,000 units per gram, being mixed with a flavoring agent and having a particle size ranging from about 20 to 80 mesh, whereby the bitter taste of the potassium penicillin is masked to such an extent that it is unobjectionable.

2. The preparation of claim 1 wherein the flavoring agent is a mixture of cyclamate sodium and melted chocolate.

3. A process for substantially eliminating the objectionable bitter taste of potassium penicillin which comprises mixing a buffered crystalline potassium penicillin with a molten wax, which is solid at room temperatures, inert to the penicillin, impervious to water and substantially inactive physiologically, cooling the resulting mixture to the solid state, grinding the same through at least one screen having a mesh size ranging from about 20 to 80 mesh to produce solid particles in which the penicillin is coated with and embedded in solid particles of said wax having a particle size within said range, and mixing the particles with a flavoring agent; the resulting preparation being stable for at least 6 months when stored at 60° C., having a potency of about 100,000 to 110,000 units per gram, producing satisfactory penicillin blood levels when administered orally and having substantially no objectionable bitter taste when taken orally.

References Cited in the file of this patent
UNITED STATES PATENTS

| 2,487,336 | Hinds | Nov. 8, 1949 |
| 2,566,200 | Hickey | Aug. 28, 1951 |
| 2,805,977 | Robinson et al. | Sept. 10, 1957 |

FOREIGN PATENTS

| 514,047 | Great Britain | Oct. 30, 1939 |

OTHER REFERENCES

Topicillin, Trademark 417,499, Oct. 30, 1945 (and attached label for Topicillin Wafers).

McDermott: "Oral Penicillin," Science, Mar. 2, 1945, pp. 228, 229.

Bunn: J.A.M.A., Sept. 29, 1945, pp. 320–327.

J. Clin. Invest., Mar. 1946, pp. 190–210, esp. p. 208, col. 2, and p. 209, col. 1.

Clin. Med., "Chocolate-Flavored Penicillin," Feb. 1950, pp. 44, 45.

Cilloral, Am. Druggist, December 1949.

J.A.P.A., Proc. Pharm. Ed., October 1945, p. 279, penicillin pastilles.

Am. J. Pharm., January 1946, p. 24.

Free: "Oral Penicillin," Science, Dec. 28, 1945, pp. 666–668.

Burns: "Stability of Dry Vitamin A Concentrates," Ind. and Eng. Chem., July 1951, pp. 1592–1593.